Patented Dec. 14, 1926.

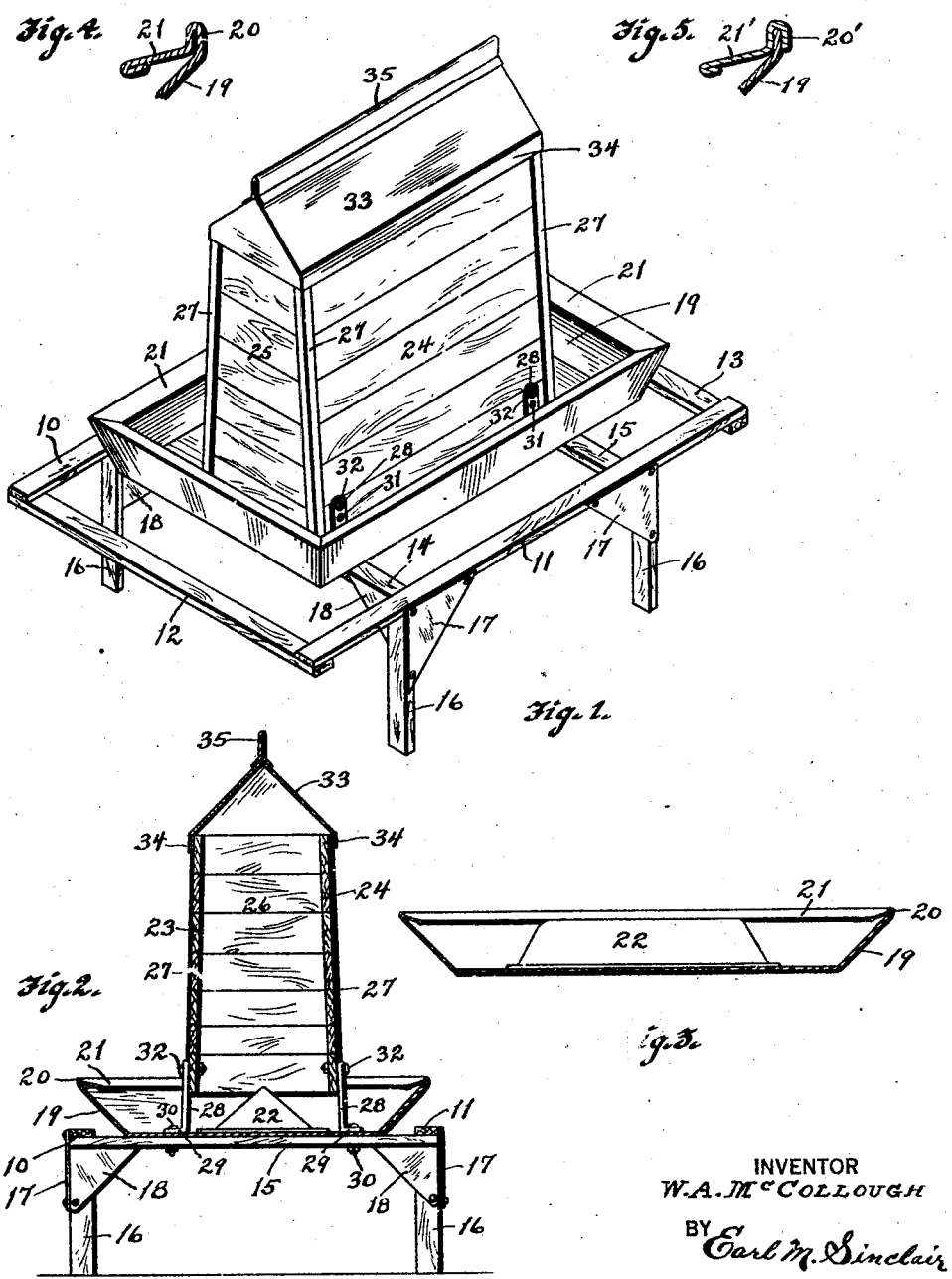

1,610,614

UNITED STATES PATENT OFFICE.

WILLIAM A. McCOLLOUGH, OF WEBSTER CITY, IOWA.

POULTRY FEEDER.

Application filed December 1, 1924. Serial No. 753,122.

The main object of this invention is to provide an improved construction for a poultry feeder.

A further object of this invention is to provide an improved feeder adapted for use with feed of any kind and so constructed and arranged as to prevent waste.

A further object of this invention is to provide an improved poultry feeder so built that the fowls will not roost upon it.

A further object of this invention is to provide an improved poultry feeder that will not occupy exclusively any of the space of the scratching pen as it is so arranged that chickens can easily run beneath it and yet it is readily accessible to the heaviest birds.

My invention consists in the construction, arrangement and combination of elements hereinafter set forth, pointed out in the claims and illustrated by the accompanying drawing, in which—

Figure 1 is a perspective view showing the complete device. Figure 2 is a cross-section of the same. Figure 3 is a longitudinal section of the pan detached. Figure 4 is a detail section illustrating one method of forming the flanged top edge of the pan.

Figure 5 is a view similar to Figure 4 showing a modified form.

In the construction of the device as shown a rectangular open frame is formed of spaced side bars 10, 11 and end bars 12, 13 suitably connected at their ends and also provided with two intermediate, spaced cross-bars 14, 15 secured at their ends to said side bars. The frame thus formed is supported by four relatively short legs 16 engaging the side bars 10 and 11 adjacent the ends of the cross-bars 14 and 15, and consequently spaced inwardly from the ends of the frame. Each leg 16 is braced to one of the side bars 10 or 11 by means of a triangular piece 17 of sheet metal, and to one of the cross-bars 14 or 15 by means of a similar brace 18, engaging said members and secured at their margins thereto. Mounted on the cross-bars 14, 15 and supported thereby is a pan 19, of sheet metal, which is of rectangular form and of less length and width than the frame so that its margins are spaced inwardly on all sides from the side and end bars of said frame. The pan 19 is formed with a plane bottom and with outwardly sloping side and end walls rising therefrom, and at their upper ends said walls are formed with vertical flanges 20, substantially one-half inch in height, and with inwardly and downwardly sloping baffle flanges 21 projecting from the bottom of said vertical flanges. The walls of the pan, upstanding flanges 20 and inwardly extending baffle flanges 21 may be integrally formed as shown in Figure 4 by pressing and bending the metal sheets of which they are formed, the free inner margin of the latter flange preferably being rolled or folded to form a smooth edge and to stiffen it. Or the flange 21' may be separately formed as shown in Figure 5 and attached to the upper margin of the upstanding flange 20' by folding thereover and crimping to effect a permanent engagement. A deflector 22 is mounted centrally within the pan 19 and suitably secured to the bottom thereof, said deflector being of ridge shape and having sloping sides and somewhat less sloping ends, the ridge or apex of said deflector preferably rising substantially to the horizontal plane of the top of the pan or to the lower margin of the baffle flanges 21. A hopper is provided and preferably is formed of side walls 23, 24 and end walls 25, 26 made of tongue-and-grooved boards embraced and secured at their ends to metal angle bars 27 extending from bottom to top of the hopper. The hopper is of less width at the top than at the bottom, is of less width and length than the pan 19 and is adapted to be mounted in a position with its open lower end within said pan, spaced above the bottom thereof and surmounting the tapered deflector 22. The mounting of the hopper is accomplished by means of four straps 28 arranged vertically, having at their lower end horizontal feet 29 resting on the bottom of the pan above the cross-bars 14, 15 and secured by bolts 30 passing through said feet, bottom and cross-bars. The upper portions of the straps 28 are formed with a plurality of spaced bolt holes 31 and a bolt 32 is adapted to be passed selectively through one of the holes of each strap and through a registering hole in the side wall of the hopper, whereby said hopper is adjustably supported above the bottom of the pan. This adjustment may be varied to regulate the distance between the bottom of the hopper and the adjacent sloping walls of the deflector 22, to suit the device to use with different kinds of feed. The top of the hopper is adapted to be closed by a cover 33 having a gable shape, that is sloping sides and triangular ends, and said cover is formed with a downwardly extending flange or rim 34 adapted to embrace the upper ends of the side and end walls of the hopper. To the ridge of the cover is applied a comb 35 extending from end to end thereof, preferably formed of a strip of metal bent and doubled lengthwise and spread at its side margins to engage the meeting edges of the sloping sides of the cover and be secured thereto. It is the function of the comb 35, which is of course narrow and thin, to prevent fowls from roosting on the top of the device. The feeder thus constructed does not exclusively occupy any of the space in the scratching pen, as the legs 16 elevate sufficiently that the fowls may easily pass beneath it and yet it is low enough that even the heaviest birds can readily hop upon the frame and feed from the pan. The elevation of the pan also prevents the scratching of straw and dirt into the feed, and is also beneficial to the fowls in that the jumping up and down relative to the frame gives them the exercise which is essential to health and egg production. The inwardly and downwardly extending flange 21 around the sides of the pan makes it impossible for the feeding fowls to scratch or push the feed out of the pan and waste it, and the saving of feed in this way alone is a material saving. The fowls will not roost on the frame surrounding the pan, for if they attempt to do this either their heads or tails would touch the pan which is disagreeable to them. If any of the feed is deposited on the sloping flange 21 the tendency is for it to fall back into the pan, because of the slope, and the upstanding flange 20 prevents it from being pushed off in the opposite direction. The hopper may be supplied with feed by removing the cover 33.

I claim as my invention—

1. A poultry feeder, comprising a frame formed of side bars, end bars and intermediate cross-bars, a pan mounted on said cross-bars and spaced from the side and end bars, a hopper, legs having their lower ends secured to said cross-bars through the bottom of the pan, each of said legs being formed with a plurality of holes in its upper portion, and bolts connecting said hopper to said legs through selected holes to provide vertically adjustable connections between said legs and the walls of said hopper.

2. A poultry feeder, comprising a frame formed of side bars, end bars and intermediate cross-bars, a pan mounted on said cross-bars and spaced from the side and end bars, a hopper, angular legs having their horizontal portions secured to said cross-bars through the bottom of the pan and having their vertical portions contacting and secured to the walls of said hopper.

Signed at Webster City, in the county of Hamilton and State of Iowa, this 5th day of March, 1924.

WILLIAM A. McCOLLOUGH.